US011399329B2

(12) United States Patent
Shih et al.

(10) Patent No.: US 11,399,329 B2
(45) Date of Patent: *Jul. 26, 2022

(54) UPLINK CARRIER CONFIGURATION AND SELECTION WITH SUPPLEMENTARY UPLINK

(71) Applicant: FG Innovation Company Limited, Tuen Mun (HK)

(72) Inventors: Mei-Ju Shih, Taipei (TW); Chie-Ming Chou, Taipei (TW); Hung-Chen Chen, Taipei (TW); Chia-Hung Wei, Taipei (TW); Yung-Lan Tseng, Taipei (TW); Yu-Hsin Cheng, Taipei (TW)

(73) Assignee: FG Innovation Company Limited, Tuen Mun (HK)

( * ) Notice: Subject to any disclaimer, the term of this patent is extended or adjusted under 35 U.S.C. 154(b) by 106 days.

This patent is subject to a terminal disclaimer.

(21) Appl. No.: 16/988,498

(22) Filed: Aug. 7, 2020

(65) Prior Publication Data
US 2020/0374776 A1    Nov. 26, 2020

Related U.S. Application Data

(62) Division of application No. 16/245,892, filed on Jan. 11, 2019, now Pat. No. 10,798,632.
(Continued)

(51) Int. Cl.
*H04W 36/30* (2009.01)
*H04W 74/08* (2009.01)
(Continued)

(52) U.S. Cl.
CPC ....... *H04W 36/30* (2013.01); *H04W 36/0069* (2018.08); *H04W 36/18* (2013.01);
(Continued)

(58) Field of Classification Search
None
See application file for complete search history.

(56) References Cited

U.S. PATENT DOCUMENTS

| 2010/0207736 A1* | 8/2010 | Park | H04W 56/0085 340/10.2 |
|---|---|---|---|
| 2011/0194432 A1 | 8/2011 | Kato et al. | |

(Continued)

OTHER PUBLICATIONS

Samsung, "Initial access for supplementary uplink frequency", R2-1711807, 3GPP TSG-RAN WG2 #99bis, Prague, Czech Republic, Oct. 9-13, 2017.
(Continued)

*Primary Examiner* — Anez C Ebrahim
(74) *Attorney, Agent, or Firm* — ScienBiziP, P.C.

(57) ABSTRACT

A user equipment (UE) comprises a processor configured to execute executable instructions to receive configuration information associated with at least two uplink carriers from a base station, the at least two uplink carriers including a supplementary uplink carrier and a normal uplink carrier, select one of the at least two uplink carriers of the base station if a power of a first downlink reference signal from the base station and measured by the UE is below a first threshold value, select a contention-free random access (CFRA) resource associated with a second downlink reference signal on the selected uplink carrier of the base station if a power of the second downlink reference signal from the base station and measured by the UE is above a second threshold value, and perform a random access procedure with the base station by using the selected CFRA resource over the selected uplink carrier.

18 Claims, 8 Drawing Sheets

Related U.S. Application Data

(60) Provisional application No. 62/616,397, filed on Jan. 11, 2018.

(51) Int. Cl.
*H04W 36/00* (2009.01)
*H04W 36/18* (2009.01)
*H04W 72/04* (2009.01)

(52) U.S. Cl.
CPC ..... *H04W 74/085* (2013.01); *H04W 74/0833* (2013.01); *H04W 72/0453* (2013.01)

(56) References Cited

U.S. PATENT DOCUMENTS

| | | | | |
|---|---|---|---|---|
| 2012/0115541 | A1* | 5/2012 | Suga | H04W 36/22 455/525 |
| 2014/0328309 | A1* | 11/2014 | Comstock | H04W 72/082 370/329 |
| 2017/0142618 | A1 | 5/2017 | Hahn et al. | |

OTHER PUBLICATIONS

CMCC, "Considerations on support of supplementary uplink frequency", R2-1709093, 3GPP TSG-RAN WG2 Meeting #99, Berlin, Germany, Aug. 21-25, 2017.

"3rd Generation Partnership Project; Technical Specification Group Radio Access Network; NR; Medium Access Control (MAC) protocol specification", 3GPP TS 38.321 V15.0.0 (Dec. 2017).

Huawei, "offline discussion report for SUL remaining issues", R2-1714173, 3GPP TSG-RAN WG2 Meeting #100, Reno, USA, Nov. 27-Dec. 1, 2017.

Nec, "Views on UL sharing of NR and LTE", R1-1716232, 3GPP TSG-RAN WG1 Meeting NR#3, Nagoya, Japan, Sep. 18-21, 2017.

Qualcomm, "Summary of Remaining Details on RACH Procedure", R1-1719160, 3GPP TSG RAN WG1 Meeting 90bis, Prague, CZ, Oct. 9-13, 2017.

Huawei et al., "Beam selection during handover", R2-1708875, 3GPP TSG-RAN WG2 #99, Berlin, Germany, Aug. 21-25, 2017.

Huawei et al., "Discussion on RA procedure related to SUL", R2-1712905, 3GPP TSG-RAN WG2 Meeting #100, Reno, Nevada, USA, Nov. 27-Dec. 1, 2017.

* cited by examiner

```
ServingCellConfig ::=        SEQUENCE {
    ...
    non-supplementaryUplink           SetupRelease { CHOICE {
        Release   NULL
        Setup     SEQUENCE {
            FrequencyInfoUL       FrequencyInfoUL
            rach-ConfigCommon     RACH-ConfigCommon
            rach-ConfigDedicated  RACH-ConfigDedicated
            ...}
        }
    }
    supplementaryUplink               SetupRelease { CHOICE {
        Release   NULL
        Setup     SEQUENCE {
            FrequencyInfoUL       FrequencyInfoUL
            rach-ConfigCommon     RACH-ConfigCommon
            rach-ConfigDedicated  RACH-ConfigDedicated
            ...}
        }
    }
}
```

FIG. 4

```
ServingCellConfig ::=        SEQUENCE {
    ...
    non-supplementaryUplink              CHOICE {
        Release    NULL
        Setup      SEQUENCE {
            FrequencyInfoUL         FrequencyInfoUL
            rach-ConfigCommon       RACH-ConfigCommon
            rach-ConfigDedicated    RACH-ConfigDedicated
            ...}
    }
    supplementaryUplink                  CHOICE {
        Release    NULL
        Setup      SEQUENCE {
            FrequencyInfoUL         FrequencyInfoUL
            rach-ConfigCommon       RACH-ConfigCommon
            rach-ConfigDedicated    RACH-ConfigDedicated
            ...}
    }
}
```

FIG. 5

UPLINK CARRIER CONFIGURATION AND SELECTION WITH SUPPLEMENTARY UPLINK

CROSS-REFERENCE TO RELATED APPLICATION(S)

This application is a divisional application of U.S. Non-Provisional patent application Ser. No. 16/245892 filed on Jan. 11, 2019, entitled "UPLINK CARRIER CONFIGURATION AND SELECTION WITH SUPPLEMENTARY UPLINK" (hereinafter referred to as "the '892 application"), which claims the benefit of and priority to U.S. provisional Patent Application Ser. No. 62/616397 filed on Jan. 11, 2018, entitled "UPLINK CARRIER CONFIGURATION AND SELECTION WITH SUPPLEMENTARY UPLINK." The disclosure of the '892 application is hereby incorporated fully by reference into the present disclosure.

FIELD

The present disclosure generally relates to a method for uplink configuration and selection with supplementary uplink performed by a user equipment and user equipment performing the same.

BACKGROUND

In New Radio (NR), high frequency band is considered to be adopted to improve transmission data rate, for example in enhanced Mobile Broad Band (eMBB) scenarios. However, the radio coverage of high frequency band diminishes over distances. Especially on uplink, the transmission power is limited for a user equipment (UE). A supplementary uplink (SUL) carrier on a lower frequency band is introduced to compensate the high frequency band uplink coverage and to improve signal quality near the cell edges.

SUMMARY

The present disclosure is directed to uplink configuration and selection with supplementary uplink for a user equipment and a related base station.

In one aspect of the present disclosure, a user equipment (UE) for wireless communication is provided. The UE comprises one or more non-transitory computer-readable media having executable instructions embodied thereon, and at least one processor coupled to the one or more non-transitory computer-readable media and configured to execute the executable instructions to receive configuration information associated with at least two uplink carriers from a base station, the at least two uplink carriers including a supplementary uplink carrier (SUL) and a normal uplink carrier (NUL), select one of the at least two uplink carriers of the base station if a power of a first downlink reference signal from the base station and measured by the UE is below a first threshold value, select a contention-free random access (CFRA) resource associated with a second downlink reference signal on the selected uplink carrier of the base station if a power of the second downlink reference signal from the base station and measured by the UE is above a second threshold value, and perform a random access procedure with the base station by using the selected CFRA resource over the selected uplink carrier of the base station.

In one aspect of the present disclosure, a method for wireless communication is provided. The method comprises receiving, by a user equipment (UE), configuration information associated with at least two uplink carriers from a base station, the at least two uplink carriers including a supplementary uplink carrier (SUL) and a normal uplink carrier (NUL), selecting, by the UE, one of the at least two uplink carriers of the base station if a power of a first downlink reference signal from the base station and measured by the UE is below a first threshold value, selecting, by the UE, a contention-free random access (CFRA) resource associated with a second downlink reference signal on the selected uplink carrier of the base station if a power of the second downlink reference signal from the base station and measured by the UE is above a second threshold value, and performing, by the UE, a random access procedure with the base station by using the selected CFRA resource over the selected uplink carrier of the base station.

BRIEF DESCRIPTION OF THE DRAWINGS

Aspects of the exemplary disclosure are best understood from the following detailed description when read with the accompanying figures. Various features are not drawn to scale. Dimensions of various features may be arbitrarily increased or reduced for clarity of discussion.

FIG. 4 is a schematic information element structure according to one embodiment of the present disclosure.

FIG. 5 is a schematic information element structure according to another embodiment of the present disclosure.

DESCRIPTION

Figure 1:
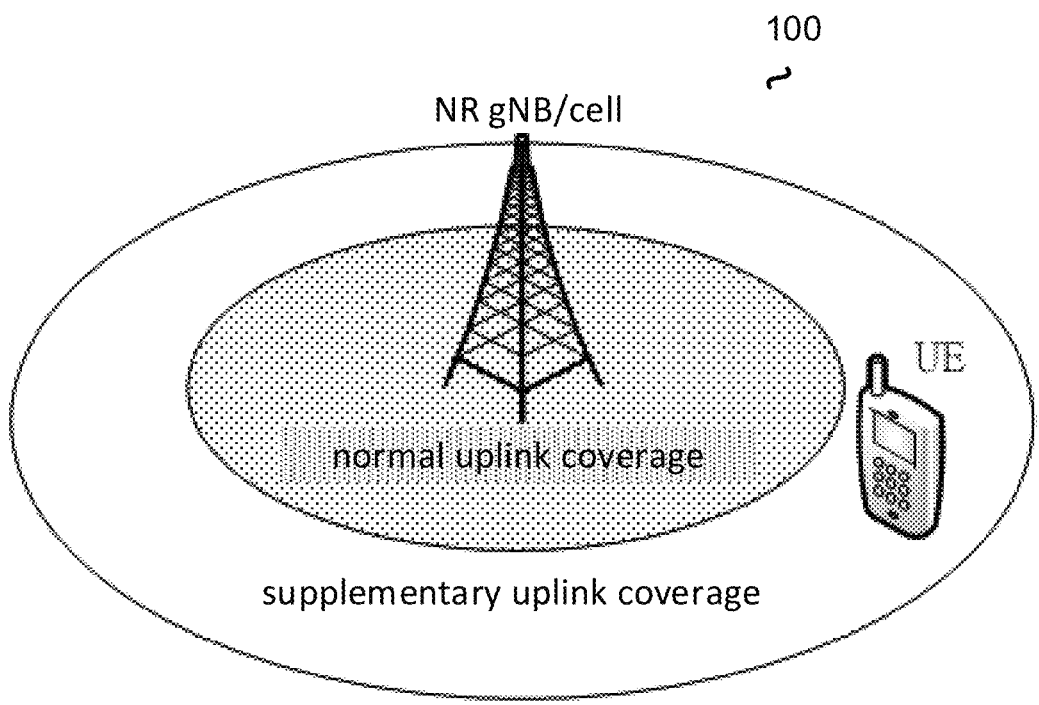
FIG. 1 is a schematic diagram illustrating a wireless communication system configured with a normal uplink carrier and a supplementary uplink carrier.

The following description contains specific information pertaining to exemplary embodiments in the present disclosure. The drawings in the present disclosure and their accompanying detailed description are directed to merely exemplary embodiments. However, the present disclosure is not limited to merely these exemplary embodiments. Other variations and embodiments of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

The description uses the phrases "in one embodiment," "in one implementation," "in some implementations," or "in some embodiments," which may each refer to one or more of the same or different embodiments. The term "coupled"

is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent.

It is noted that the term "and/or" includes any and all combinations of one or more of the associated listed items. It will also be understood that, although the terms first, second, third etc. may be used herein to describe various elements, components, regions, parts and/or sections, these elements, components, regions, parts and/or sections should not be limited by these terms. These terms are only used to distinguish one element, component, region, part or section from another element, component, region, part or section. Thus, a first element, component, region, part or section discussed below could be termed a second element, component, region, part or section without departing from the teachings of the present disclosure.

It should be noted that, in the present disclosure, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, a personal digital assistant (PDA), or a television display with wireless communication capability. The UE is configured to receive and transmit signals over an air interface to one or more cells in a radio access network.

A base station may include, but is not limited to a node B (NB) as in a Universal Mobile Telecommunication System (UMTS), an evolved node B (eNB) as in Long-Term Evolution Advanced (LTE-A), a radio network controller (RNC) as in the UMTS, a base station controller (BSC) as in Global System for Mobile Communication/GSM EDGE (Enhanced Data rate for GSM Evolution) Radio Access Network (GSM/GERAN), a next generation eNB (ng-eNB) as a node providing Evolved Universal Terrestrial Radio Access (E-UTRA) user plane and control plane protocol terminations towards the UE and connected via the NG interfaces to the 5G core network (5GC), a next generation node B (gNB) as in the 5G Access Network (5G-AN), and any other apparatus capable of controlling radio communication with cellular positioning technology and managing radio resources within a cell. The base station may connect to serve the one or more UEs through a radio interface to the network. A base station, a cell, a gNB and a gNB/cell may be used interchangeably hereinafter.

A UE in RRC_CONNECTED mode may measure a downlink (DL) signal quality sent from a base station via, for example, broadcast signal, dedicated control signal and/or data stream signal. In some implementations, the UE may measure the DL signal periodically. The base station may send random access resources/parameters (e.g., physical random access channel configuration), supplementary uplink (SUL) carrier configuration and/or non-supplementary uplink (non-SUL) carrier configuration by a broadcast message or a Radio Resource Control (RRC) message (e.g., RRC Reconfiguration message) to UEs. In some implementations, the configurations carried in the broadcast message may be updated by an RRC message (e.g., RRC Reconfiguration message) sent from the base station. It is noted that the system information (e.g., System Information Block 1 (SIB 1), other System information (SI)) may be the broadcast message. It is noted that the UE may receive the RRC message via dedicated signaling.

In one embodiment of the present disclosure, NR gNB/cell configures, by a configuration information, an RRC_CONNECTED UE with an SUL carrier and with a normal uplink (non-SUL or NUL) carrier in a special cell (SpCell) or a primary cell (PCell). The SpCell may be the primary cell of a master cell group (MCG) or the primary cell of a secondary cell group (SCG). If the multi-connectivity is not considered, the SpCell may refer to a cell. If the SpCell belongs to an MCG, the configuration information includes an MCG configuration Information Element (e.g., MasterCellGroup IE, MasterCellGroupConfig IE) in a form of (or a list of) Cell Group Configuration Information Element (e.g., CellGroupConfig IE, CellGroupConfigCommon IE). If the SpCell belongs to an SCG, the configuration information includes an SCG configuration Information Element (e.g., SeondaryCellGroup IE, SecondaryCellGroupToAddModList IE) in a form of (or a list of) Cell Group Configuration Information Element (e.g., CellGroupConfig IE, CellGroupConfigCommon IE). The Cell Group Configuration Information Element (e.g., CellGroupConfig IE, CellGroupConfigCommon IE) may further include SpCell configuration (e.g., SpCellConfig IE) and/or secondary cell (SCell) configuration (e.g., SCellConfig IE). In some implementations, the NR gNB/cell may send the MCG configuration and/or SCG configuration to the UE via an RRC message (e.g., RRC Reconfiguration message).

In FIG. 1, an NR wireless communication system 100 includes an NR base station (e.g., NR gNB/cell) and a user equipment (UE) in communicatively connection with the NR base station. The UE may or may not operate in an RRC_CONNECTED mode. For example, the UE may operate in an RRC_IDLE, RRC_INACTIVE, or RRC_CONNECTED mode. There are at least two uplink carriers that are configurable for the UE, in which one of the two uplink carriers is for normal uplink (or non-supplementary uplink, non-SUL, or NUL) connection with high frequency band and small radio coverage while the other is for supplementary uplink connection with low frequency band and extensive radio coverage.

If being configured with both SUL carrier and NUL carrier based on the configuration information by the NR gNB/cell, the UE may select an uplink carrier, based on a reference signal received power (RSRP) measured by itself in downlink (DL), to perform the random access procedure such as the random access preamble transmission. The UE may perform the random access preamble transmission with random access resources/parameters selected according to a received power of another DL reference signal over the selected uplink carrier. The random access resource(s), random access parameter(s) and random access resource(s)/parameter(s) may be used interchangeably hereinafter.

Figure 2:
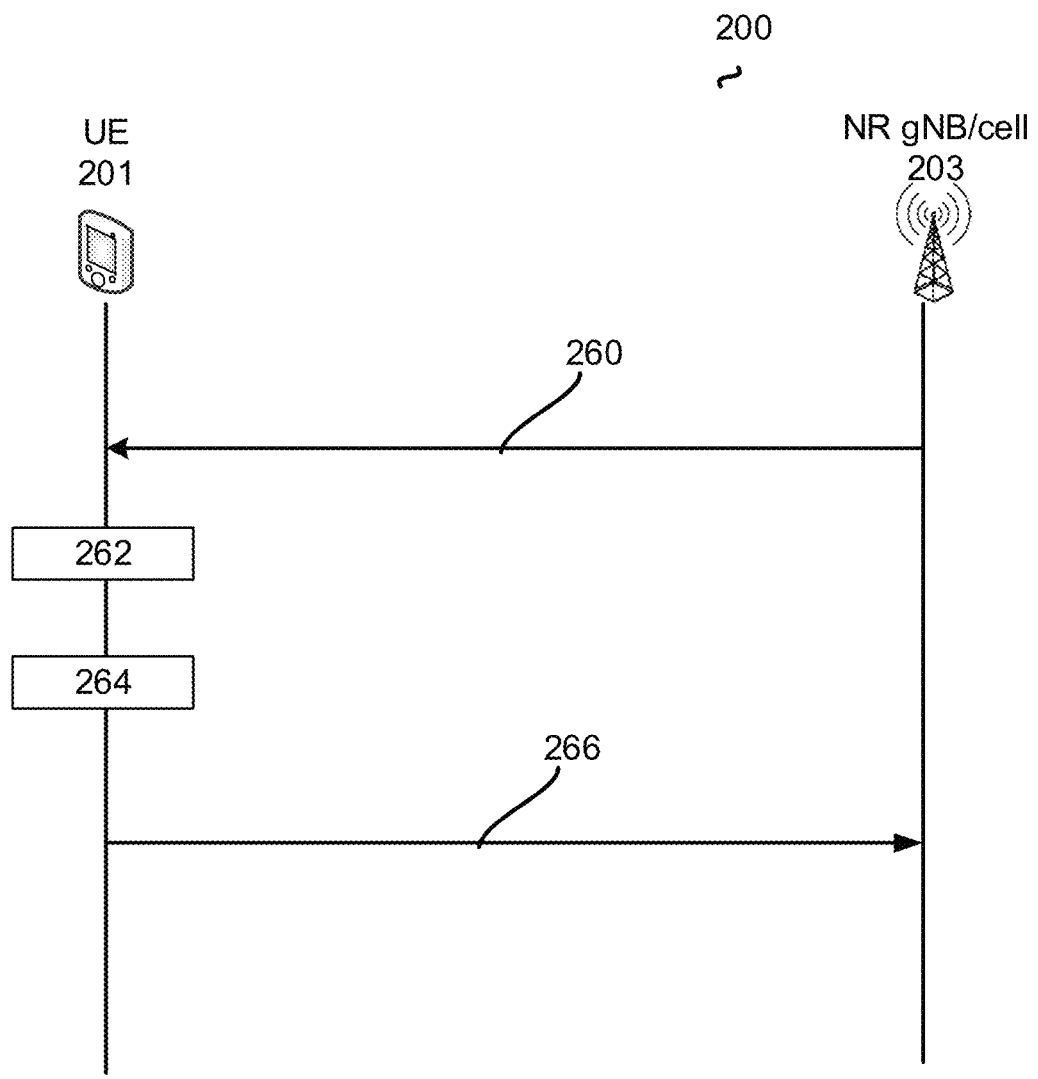
FIG. 2 is a schematic diagram illustrating a wireless communication system according to one embodiment of the present disclosure.

In FIG. 2, a schematic diagram is provided for an NR wireless communication system according to one embodiment of the present disclosure. The NR wireless communication system 200 includes a UE 201 and an NR gNB/cell 203. NR gNB/cell 203 sends a configuration information 260 to the UE 201. Configuration information 260 may be sent via an RRC message or a system information broadcasting. The configuration information 260 may include (but not limit to) the cell group configuration (e.g., CellGroupConfig IE, CellGroupConfigCommon IE) for the MCG configuration and/or SCG configuration. At least one of SUL and NUL carrier configurations is carried in configuration information 260. The SUL and NUL carrier configurations may further include associated random access resources/parameters. UE 201 may measure a reference signal received power from NR gNB/cell 203. The UE may receive the reference signal according to reference signal (RS) configuration. For example, the UE may receive the RS periodically according to the RS configuration. The UE may receive the RS configuration via a broadcast system information and/or an RRC message. In action 262, UE 201 may select an uplink carrier among the configured NUL and/or configured SUL carriers based on RSRP measurement results. In action 264, UE 201 may further select random access resources/parameters in association with the selected uplink carrier. In action 266, UE 201 may perform a random access preamble transmission to NR gNB/cell 203 using the selected random access resources/parameters over the selected uplink carrier. In some implementations, if the UE is in RRC_CONNECTED mode or in RRC_INACTIVE mode, the NR gNB/cell may send an RRC message (e.g., RRC Reconfiguration message, RRC Reconfiguration message with suspend configuration) to reconfigure the cell (e.g., SpCell, SCell).

Figure 3A:
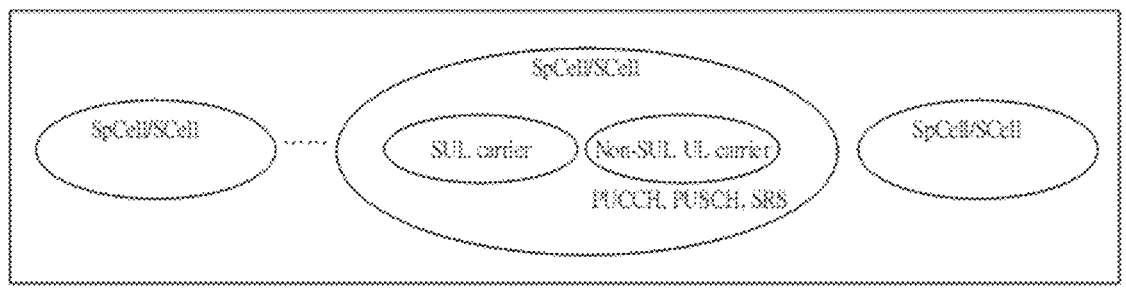
FIGS. 3A and 3B are schematic diagrams illustrating uplink configurations for physical uplink control channel (PUCCH) according to one embodiment of the present disclosure.
Figure 3B:
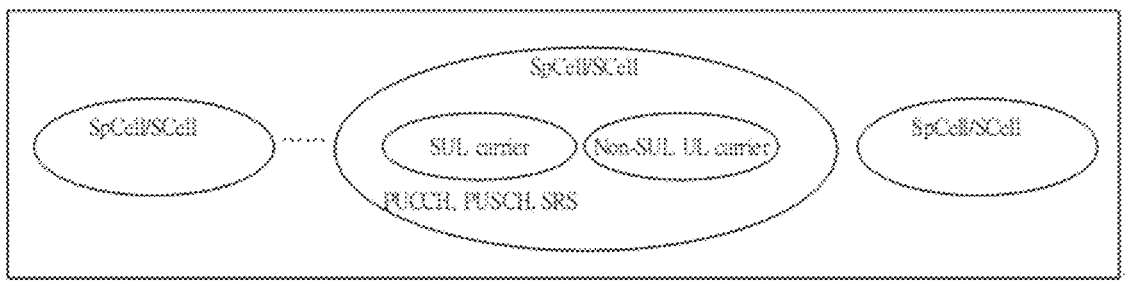

According to one embodiment of the present disclosure, one serving cell, which may be either a primary cell or a secondary cell, can operate on an NUL carrier or an SUL carrier. In some implementations, the serving cell may be in the MCG or SCG. In FIG. 3A, it is shown that the physical uplink control channel (PUCCH) is configured on the NUL carrier. In FIG. 3B, it is shown that the PUCCH is configured on the SUL carrier. A UE may be configured with such the serving cell on the NUL (or the SUL) carrier via the special cell configuration (e.g., SpCellConfig IE). The serving cell may be considered in Primary Timing Advanced Group (PTAG). A Timing Advance Group containing the SpCell of a Medium Access Control (MAC) entity is referred to as PTAG. That is, cells with an UL configured in PTAG may use the same timing reference cell and the same Timing Advance value. The serving cell may be a primary cell or a secondary cell. In some implementations, if the serving cell is an SCell in an MCG or in an SCG, the UE may be configured with the SCell configuration (e.g., SCellConfig IE). The SCell configuration may contain serving cell configuration (e.g., ServingCellConfig IE, ServingCellConfigCommon IE, ServingCellConfigDedicated IE) for the secondary cell. The SCell configuration may be included in the cell group configuration (e.g., CellGroupConfig IE, CellGroupConfigCommon IE).

When the time alignment timer (e.g., timeAlignmentTimer) associated with the PTAG expires, the UE's MAC entity will flush all Hybrid Automatic Repeat request (HARM) buffers for all serving cells, notify the UE's RRC entity to release PUCCH and sounding reference signal (SRS) for all serving cells, clear any configured downlink assignments and configured uplink grants, and consider all running time alignment timers as expired. In such situation, the NR gNB/cell cannot measure the uplink signal quality via SRS in all serving cells.

The special cell configuration is used to configure the SpCell. The special cell configuration may include synchronization reconfiguration (e.g., ReconfigurationWithSync IE). The synchronization reconfiguration may further include serving cell configuration (e.g., ServingCellConfig IE, ServingCellConfigCommon IE, ServingCellConfigDedicated IE). The serving cell configuration may further contain IE(s) specifying uplink frequency configuration. For example, the serving cell configuration may contain the NUL carrier frequency information (e.g., FrequencyInfoUL IE). For example, the serving cell configuration may contain the SUL carrier frequency information (e.g., SupplementaryUplink IE). In some implementations, the serving cell configuration may contain the PUCCH configuration, physical uplink shared channel (PUSCH) configuration, SRS configuration, and/or timing alignment group configuration (e.g., TAG identity (ID)).

The random access parameters may be contained in an IE corresponding to the associated uplink carrier. In one embodiment, the common Random Access Channel (RACH) configuration (e.g., RACH-ConfigCommon IE, RACH-ConfigGeneric IE) may contain the contention-based random access parameters for the SUL carrier, where the common RACH configuration is carried in part of supplementary uplink configuration (e.g., SupplementaryUplinkConfig IE, SupplementaryUplink IE, UplinkConfigCommonSIB IE, UplinkConfig IE). In another embodiment, common RACH configuration may contain the contention-based random access parameters for the NUL carrier, where the common RACH configuration is carried in part of non-supplementary uplink configuration (e.g., non-SupplementaryUplinkConfig IE, UplinkConfig IE, FrequencyInfoUL IE, UplinkConfigCommonSIB IE). In still another embodiment, common RACH configuration may have an indicator to correspond the contention-based random access parameters to an uplink carrier. In some implementations, the common RACH configuration is carried in part of the serving cell configuration.

The indicator provided in the common RACH configuration is used to indicate which type of uplink carriers the contention-based random access parameters are associated with. In some implementations, a Boolean value may be assigned to the indicator in the common RACH configuration to tell whether the contention-based random access parameters are for the SUL carrier or not. For example, if the indicator is "1", the indicator may correspond the contention-based random access parameters to one uplink carrier (e.g., NUL). If the indicator is "0", the indicator may correspond the contention-based random access parameters to another uplink carrier (e.g., SUL). In some implementations, a choice-type indicator may be used in the common RACH configuration to indicate if the contention-based random access parameters are associated to the SUL, NUL or both uplink carriers. For example, choice {NUL, SUL, both, . . . } may define several uplink carriers in the choice type, to which the contention-based random access parameters correspond. If the indicator is "NUL" from the choice type, the indicator may correspond the contention-based random access parameters to the NUL carrier. If the indicator is "SUL", the indicator may correspond the contention-based random access parameters to the SUL carrier. If the indicator is "both", the indicator may correspond the contention-based random access parameters to both SUL and NUL carriers. The choice indicator allows the forward compatibility extension if one cell supports more than two uplink carriers.

The special cell configuration carried in part of the configuration information may include the synchronization reconfiguration (e.g., ReconfigurationWithSync IE) that contains the dedicated random access configuration (e.g., RACH-ConfigDedicated IE) carrying the contention-free random access parameters. An indicator may be provided with the dedicated random access configuration to explicitly associate such contention-free random access parameters with either SUL or NUL carrier. For example, a Boolean value may be assigned in the dedicated random access configuration using a Boolean indicator to tell whether the contention-free random access parameters are for the SUL carrier or not. For another example, a choice indicator may be used for the dedicated random access configuration to indicate the contention-free random access parameters associated to the SUL, NUL or both uplink carriers. The choice indicator allows the forward compatibility extension if one cell supports more than two uplink carriers.

The NR gNB/cell may indicate a random access preamble pool in the common RACH configuration (e.g., RACH-ConfigCommon IE, RACH-ConfigGeneric IE) on an uplink basis. The NR gNB/cell may utilize a single common RACH configuration for both SUL and NUL carriers per cell. For example, if the single common RACH configuration is configured for an SpCell, upon receiving the single common RACH configuration, the UE may apply the configuration for both SUL and NUL on the corresponding cell. The single common RACH configuration may further include a list of sub-configurations for various random access parameters. This list of sub-configurations may not be limited to the preamble pool configuration but include other parameters (or say, random access resources) such as the target received preamble power (e.g., PreambleReceivedTargetPower), random access response window (e.g., RA-ResponseWindow) and maximum number of preamble transmission (e.g., PreambleTransMax).

A SetupRelease structure may be adopted in the serving cell configuration (e.g., ServingCellConfig IE, ServingCellConfigCommon IE, ServingCellConfigDedicated IE) to independently set up and/or release the UL carrier-specific configuration (e.g., NUL carrier configuration and SUL carrier configuration) individually. In some implementations, the SetupRelease structure may include a choice-type structure, e.g., a choice between releasing the configuration and setting up the configuration. For example, if the NR gNB/cell sends a SetupRelease structure with a release choice, the UE would release the corresponding configuration. If the NR gNB/cell sends a SetupRelease structure with a setup choice, the UE would set up the corresponding configuration. The configuration for NUL carrier (e.g., NonsupplementaryUplink IE, UplinkConfig IE, UplinkConfigCommon IE) and the configuration for SUL carrier (e.g., SupplementaryUplink IE, UplinkConfig IE, SupplementaryUplinkConfig IE, UplinkConfigCommon IE) may be independently specified with the SetupRelease structure. NUL carrier and/or SUL carrier may be updated and/or released independently with the SetupRelease structure. In some implementations, the serving cell configuration may include at least one SetupRelease structures. In FIG. 4, the serving cell configuration (e.g., ServingCellConfig IE) may include one SetupRelease structure for NUL carrier configuration and another SetupRelease structure for SUL carrier configuration individually. In some implementations, the SetupRelease structure for the SUL (or NUL) configuration may contain a threshold value associated with a reference signal received and measured by the UE, e.g., an RSRP threshold value. The value for RSRP threshold (RSRP threshold value) may be put in an independent field in the SetupRelease structure (e.g., an SUL configuration with a SetupRelease structure, an NUL configuration with a SetupRelease structure) in the serving cell configuration. In some implementations, the RSRP threshold value may be put in a field of the uplink frequency information configuration (e.g., FrequencyInfoUL IE, FrequencyInfoUL-SIB IE). The UL carrier configuration with a SetupRelease structure may include the uplink frequency information configuration. The RSRP threshold value may be set to positive infinity, negative infinity or zero. If the RSRP threshold value is set to zero, the unit of the value may not be dBm but Watt (W). In some implementations, the UE may receive the RSRP threshold value via system information (e.g., SIB1, other SI) broadcast by the NR gNB/cell or via RRC message (e.g., RRC Reconfiguration message) transmitted by the NR gNB/cell.

When the UE selects the UL carrier based on the RSRP threshold, the UE may select the SUL carrier if the RSRP threshold value is set to positive infinity; the UE may select the NUL (non-SUL) carrier if the RSRP threshold is set to zero or negative infinity.

Instead of the SetupRelease structure, a choice structure between setup and release may be used to indicate uplink carrier-specific configurations. In FIG. 5, an exemplary choice structure is illustrated.

In some implementations, if the cell (e.g., SpCell, SCell) is configured with both SUL carrier and NUL carrier, the UE may select which uplink carrier to perform Random Access Preamble transmission based on the measured RSRP of the downlink carrier and/or based on the types of random access resources/parameters (e.g., contention-based and/or contention-free) configured to the SUL carrier and/or NUL carrier.

Figure 6:
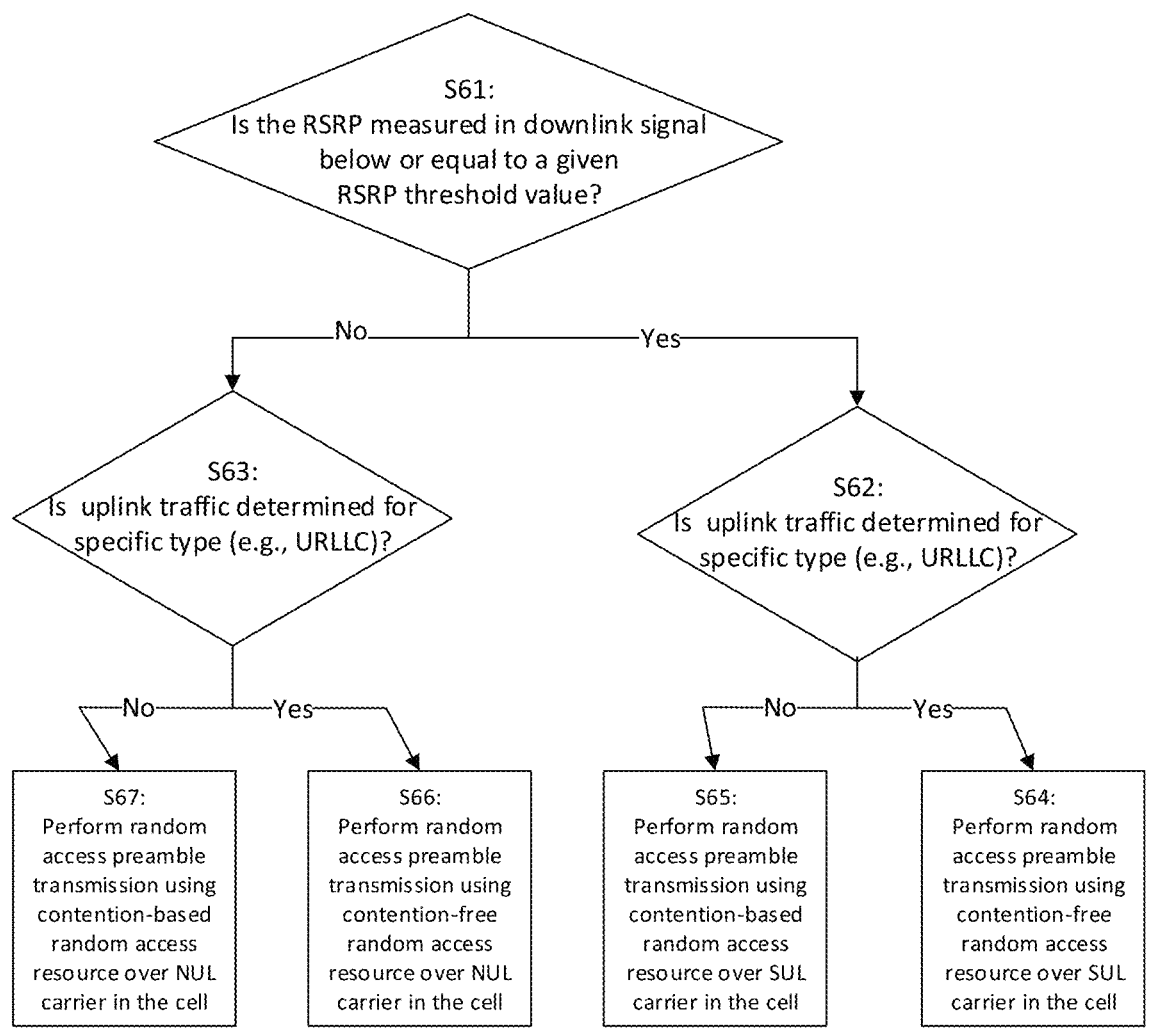
FIG. 6 is a decision flow chart for a UE to perform random access preamble transmission according to one embodiment of the present disclosure.

After receiving the configuration information, the UE may select an uplink carrier based on the uplink carrier configuration. FIG. 6 schematically illustrates a decision flow chart for an RRC_CONNECTED UE to select an uplink carrier and corresponding random access resources according to one embodiment of the present disclosure. It is noted that the decision flow chart in FIG. 6 may be applied to an RRC_INACTIVE UE or an RRC_IDLE UE. The decision flow chart of FIG. 6 may be applied to, but not limited to, a situation when an uplink transmission is needed after time alignment timer(s) expires. At action S61, the UE may determine if a downlink RSRP is below (or equal to) the RSRP threshold value given in a corresponding configuration (e.g., ServingCellConfig IE). The UE may select the SUL carrier (if configured) if an RSRP measured in downlink is below (or equal to) the RSRP threshold value given in the corresponding configuration. The UE may select the random access resources/parameters on the selected SUL carrier in the cell (e.g., SpCell, SCell). If both contention-based and contention-free random access resources/parameters are configured in association with the SUL carrier, the UE may further judge whether the uplink traffic is for specific access requests (e.g., emergency call, specific access category or Ultra-Reliable and Low Latency Communications (URLLC) traffic) at action S62 and action S63. If the uplink traffic is determined for a specific access request, the UE may perform the random access preamble transmission based on the contention-free random access resources/parameters over the selected SUL carrier at action S64; if the uplink traffic is determined not for a specific access request, the UE may perform the random access preamble transmission based on the contention-based random access resources/parameters over the selected SUL carrier at action S65. In some implementations, if one of the contention-based and contention-free random access parameters is configured specifically for the SUL carrier, the UE may perform the random access preamble transmission based on the random access resources/parameters configured specifically for the SUL carrier without checking the uplink traffic type on the condition that the RSRP of NR DL signal is less than (or equal to) the RSRP threshold.

At action S63, the UE may select the NUL carrier if the measured RSRP is above the RSRP threshold value. At actions S66 and S67, the UE may select the random access resources/parameters on the selected NUL carrier in the cell (e.g., SpCell, SCell). If both contention-based and contention-free random access resources/parameters are configured in association with the NUL carrier, the UE may further judge whether the uplink traffic is for specific access requests (e.g., emergency call, specific access category or URLLC traffic) at action S66 and action S67. If the uplink traffic is determined for a specific access request, the UE may perform the random access preamble transmission based on the contention-free random access resources/parameters over the selected NUL carrier at action S66; if the uplink traffic is determined not for a specific access request, the UE may perform the random access preamble transmission based on the contention-based random access resources/parameters over the NUL carrier at action S67. In some implementations, if one of the contention-based and contention-free random access parameters is configured specifically for the NUL carrier, the UE may perform the random access preamble transmission based on the random access resources/parameters configured specifically for the NUL carrier without checking the uplink traffic type on the condition that the RSRP of NR DL signal is above the RSRP threshold value.

Figure 7:
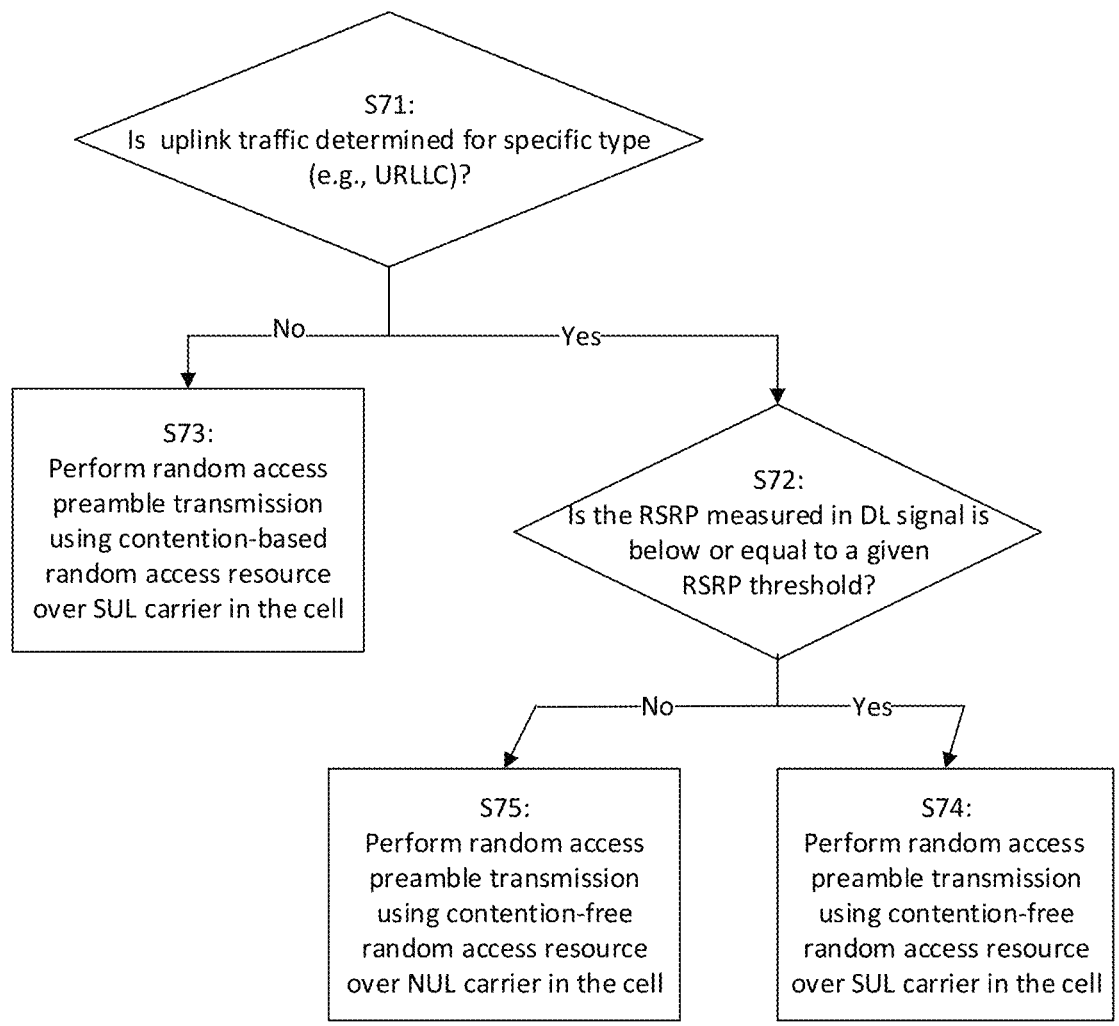
FIG. 7 is a decision flow chart for a UE to perform random access preamble transmission according to another embodiment of the present disclosure.

After receiving the configuration information, the UE may select an uplink carrier based on the uplink carrier configuration. FIG. 7 schematically illustrates a decision flow chart for an RRC_CONNECTED UE to select an uplink carrier and corresponding random access resources according to another embodiment of the present disclosure. It is noted that the decision flow chart in FIG. 7 may be applied to an RRC_INACTIVE UE or an RRC_IDLE UE. In FIG. 7, the UE may select random access resources/parameters based on uplink traffic types and a measured RSRP. The decision flow chart of FIG. 7 may be applied to, but not limited to, a situation when an uplink transmission is needed after time alignment timer(s) expires. At action S71, the UE may judge whether the uplink traffic is for specific access requests (e.g., emergency call, specific access category or URLLC traffic). If the uplink traffic is determined for a specific access request, the UE may further determine whether the measured DL RSRP value is below (or equal to) the RSRP threshold value given in the corresponding configuration at action S72; if the uplink traffic is determined not for a specific access request, the UE may perform the random access preamble transmission based on contention-based random access resources/parameters over an SUL carrier in the cell (e.g., SpCell, SCell) at action S73. If the DL RSRP is measured to be below (or equal to) the RSRP threshold value after action S72, the UE may select an SUL carrier to perform the random access preamble transmission based on the contention-free random access resources/parameters associated with the selected SUL carrier at action S74; if the DL RSRP is measured to be above the RSRP threshold value after action S72, the UE may perform the random access preamble transmission based on the contention-free random access resources/parameters over the NUL carrier in the cell (e.g., SpCell, SCell) at action S75. In some implementations, if the UE are not configured with the contention-free random access resources/parameters of the SUL carrier in the cell (e.g., SpCell, SCell), the UE may perform the random access preamble transmission based on contention-based random access resources/parameters over an SUL carrier in the cell if the uplink traffic is determined for a specific access request and the measured DL RSRP value is below (or equal to) the RSRP threshold value given in the corresponding configuration. In some implementations, if the UE are not configured with the contention-free random access parameters of the NUL carrier in the cell (e.g., SpCell, SCell), the UE may (1) perform the random access preamble transmission based on the contention-based random access resources/parameters over the NUL carrier in the cell, or (2) perform the random access preamble transmission based on the contention-free random access resources/parameters over an SUL carrier in the cell, or (3) perform the random access preamble transmission based on the contention-based random access resources/parameters over an SUL carrier in the cell, when the uplink traffic is determined for a specific access request and the measured DL RSRP value is above an RSRP threshold value. In some implementations, the UE may select among the three approaches (1)(2)(3) following the priority (e.g., approach (1) has the highest priority, approach (3) has the lowest priority). The priority may be indicated by the NR gNB/cell via system information or via an RRC message (e.g., RRC Reconfiguration message). The priority may be UE's implementation.

In some other embodiments, the UE may be further configured with another RSRP threshold value to determine which of contention-based random access procedure and contention-free random access procedure should be performed. If the UE measures a DL RSRP to be higher than another RSRP threshold value, the UE may select contention-free random access resources/parameters to perform contention-free random access procedure with the contention-free random access resources having been configured in either UL carrier (e.g., SUL or NUL carriers). If the measured DL RSRP is less than (or equal to) another RSRP threshold value, the UE may perform the contention-based random access procedure with the contention-based random access resources having been configured in either UL carrier (e.g., SUL or NUL carriers). If another RSRP threshold value is set to positive infinity, the UE may perform the contention-based random access procedure. If another RSRP threshold value is set to zero, the UE may perform the contention-free random access procedure. If another RSRP threshold value is set to negative infinity, the UE may perform the contention-free random access procedure. It is noted that this threshold value for determining the type of random access procedure may or may not be identical to the RSRP threshold value on which the selection of an uplink carrier is based.

It is noted that the random access resources (in the contention-based random access procedure and/or the contention-free random access procedure) may be selected in association to the signal quality of the SS (Synchronization Signal) blocks and/or CSI-RS (Channel State Information Reference Signal) resources. The UE may select the contention-free random access resources if either SS block or CSI-RS measured by itself is above a corresponding RSRP threshold value. Whether the random access procedure is successful may depend on the signal quality of SS blocks and/or CSI-RS.

In some embodiments, if the two RSRP thresholds both are configured to the UE, the UE may compare the measured DL RSRP (e.g., SS blocks, CSI-RS) to these two thresholds to select a corresponding random access procedure (e.g., contention-based random access procedure, contention-free random access procedure) on the selected UL carrier if the random access procedure fails.

In some embodiments of the present disclosure, the random access procedure may fail. There are several reasons causing the random access procedure to fail. For example, the maximum preamble (re)transmission times are achieved; the signal quality of Physical Random Access Channel (PRACH) resources is below a threshold; the associated physical resources to the PRACH resources has poor signal quality; the time spent on the random access procedure exceeds a given timer.

In some implementations, if the random access procedure fails in one UL carrier, the UE may switch to another UL carrier to perform the random access procedure. In some implementations, the UE may continue timer(s)/counter(s) calculated in the failed random access procedure, e.g., the existing parameters are not reset. In some implementations, the UE may abort the timer(s)/counter(s) calculated in the failed random access procedure, and begin a new random access procedure. For example, if the UE is configured with both non-SUL carrier and SUL carrier and the corresponding random access resources/parameters on each UL carrier, the UE may by default first perform the random access procedure on the SUL carrier. If at least one random access procedure (e.g., a random access procedure following contention-based random access resources/parameters, a random access procedure following contention-free random access resources/parameters) fails on the SUL carrier, the UE may switch to the non-SUL carrier to perform the random access procedure.

In some implementations, if one UL carrier is configured with contention-based random access resources/parameters and the other UL carrier is configured with contention-free random access resources/parameters, the UE may first select the UL carrier which is configured with contention-free random access resources/parameters. The UE may select the UL carrier based on the types of random access resources/parameters.

In some implementations, if the contention-free random access procedure fails in either SUL carrier or non-SUL carrier, the UE may perform the contention-based random access procedure (if the contention-based random access resources/parameters are configured) on the same UL carrier.

In some implementations, if the contention-free random access procedure fails in either SUL carrier or non-SUL carrier, the UE may perform the random access procedure on the other UL carrier. If both contention-free and contention-based random access resources/parameters are configured on the other UL carrier, the UE may perform the contention-free random access procedure on the other UL carrier as the high priority. For example, the UE may perform the contention-free random access procedure on the other UL carrier rather than the contention-based random access procedure. For example, the UE may perform the contention-free random access procedure on the other UL carrier with a higher probability than the contention-based random access procedure on the other UL carrier.

If the received signal of the random access response on one UL carrier is below a threshold, the UE can switch to perform the random access procedure on the other UL carrier. The NR gNB/cell may configure the threshold to the UE via system information (e.g., SIB1, other SI) or via an RRC message (e.g., RRC Reconfiguration message).

It is noted that the embodiments mentioned in the present disclosure may not be limited to the RRC_CONNECTED UE. These embodiments may be applied for the RRC_INACTIVE UE and/or RRC_IDLE UE. For example, the selection among random access resources/parameters and UL carriers based on the type of access requests may also be applied for the RRC_IDLE UE and/or RRC_INACTIVE UE. For example, the selection among random access resources/parameters and UL carriers based on the measured DL RSRP may also be applied for the RRC_IDLE UE and/or RRC_INACTIVE UE.

If there is no other contention-based and/or contention-free random access resources/parameters on the UL carriers associated to the same DL carrier, the UE may enter to the RRC_IDLE mode (e.g., if the security is not activated), or RRC_INACTIVE mode, or perform the RRC connection reestablishment procedure (e.g., if the security is activated).

It is noted that the embodiments mentioned above in the present disclosure may not be limited to the conditions when the time alignment timer expires. For example, other triggering cases to perform random access preamble transmission may be applied.

It is noted that the configuring of contention-free and/or contention-based random access resources/parameters on the SUL or NUL carrier may also be performed via the NR gNB/cell's broadcast messages, for example, SIB1, remaining system information (RMSI), other SI and on demand SI.

It is noted that in the present disclosure, the value of RSRP threshold can be set to zero or (positive or negative) infinity. If it is zero, the RSRP threshold value may be configured in unit of Watt (W) or milliWatt (mW). In some implementations, the RSRP threshold(s) may be included in the common RACH configuration (e.g., RACH-Config-Common IE). In some implementations, the RSRP threshold value may range from zero to a defined number (or to infinity). In some implementations, the RSRP threshold value may range from negative infinity to positive infinity.

In some embodiments, the NR gNB may send the configuration information to the UE for (re)configuring the cell (e.g., SpCell, SCell) with SUL and NUL carriers simultaneously via a single RRC message (e.g., RRC Reconfiguration message, RRCConnectionReconfiguration message) or sequentially via separate RRC messages (e.g., RRC Reconfiguration message, RRCConnectionReconfiguration message).

A. Simultaneous SUL and NUL Configuration

If the RRC_CONNECTED UE is configured with both SUL and NUL carriers by the NR gNB/cell via an RRC message (e.g., RRC Reconfiguration message) simultaneously, the supplementary uplink configuration (e.g., SupplementaryUplink IE, UplinkConfig IE, SupplementaryUplinkConfig IE, UplinkConfigCommonSIB IE) and non-supplementary uplink configuration (e.g., non-SupplementaryUplinkConfig IE, FrequencyInfoUL IE, UplinkConfig IE, UplinkConfigCommon IE) may both have valid information to configure the cell (e.g., SpCell, SCell). In some implementations, the common RACH configuration includes random access resources/parameters, for different uplink carriers. For example, only one uplink carrier (either SUL or NUL carrier) is configured in association with contention-based random access parameters; all uplink carriers are configured, respectively, in association with separate contention-based random access parameters; only one uplink carrier (either SUL or NUL carrier) is configured in association with contention-free random access parameters; all uplink carriers are configured, respectively, in association with separate contention-free random access parameters.

B. Sequential SUL and NUL Configuration

If the NR gNB configures the UE with SUL and NUL carriers sequentially via separate RRC messages (e.g., RRC Reconfiguration message) or separate system information (SI), each RRC message (e.g., RRC Reconfiguration message)/SI may contain one or more uplink carrier configuration and the associated contention-based and/or contention-free random access resources/parameters. Note that the SI may be broadcast or transmitted via dedicated signaling.

In one embodiment, the UE may not update or remove currently existing uplink carrier configuration and the associated random access parameters (contention-based and/or contention-free) when receiving the configuration information that contains null uplink carrier configuration IE (e.g., a null value assigned in the supplementary uplink configuration, a null value assigned in the non-supplementary uplink configuration).

In one embodiment, the UE may update or remove currently existing uplink carrier configuration and the associated random access parameters (contention-based and/or contention-free) when receiving the configuration information that contains null uplink carrier configuration IE (e.g., a null value assigned in the supplementary uplink configuration, a null value assigned in the non-supplementary uplink configuration).

In one embodiment, the UE may update or remove currently existing uplink carrier configuration and the associated random access parameters (contention-based and/or contention-free) when receiving the configuration information that contains a removal indicator carried in part of the uplink carrier configuration (e.g., in the supplementary uplink configuration, in the non-supplementary uplink configuration, in the contention-based random access parameters, in the contention-free random access parameters, in the common RACH configuration, in the dedicated random access configuration).

In one embodiment of the present disclosure, the NR gNB/cell may send the configuration information to configure RRC_CONNECTED UE with the SUL carrier only in the cell (e.g., SpCell, SCell).

In some implementations, the supplementary uplink configuration (e.g., SupplementaryUplink IE, UplinkConfig IE, SupplementaryUplinkConfig IE, UplinkConfigCommonSIB IE) may contain contention-based random access parameters associated with the SUL carrier. For example, the supplementary uplink configuration may include the common RACH configuration (e.g., RACH-ConfigCommon IE) specifically corresponding to random access parameters over the SUL carrier. Since the cell (e.g., SpCell, SCell) may not be configured with normal uplink (non-SUL or NUL) carrier, the serving cell configuration (e.g., ServingCellConfig IE, ServingCellConfigCommon IE, ServingCellConfigDedicated IE) may not include the NUL configuration (e.g., frequency information for the NUL carrier).

In some implementations, a Boolean value may be assigned in the supplementary uplink configuration using a Boolean indicator (e.g., RachCommonUsage) to inform the UE of the association between the SUL carrier and the random access parameters (e.g., contention-based random access parameters, contention-free random access parameters, common RACH configuration, dedicated random access configuration). In some implementations, the NR gNB/cell may configure the NUL carrier to the UE via the serving cell configuration. The serving cell configuration may comprise the random access parameters. In some implementations, one Boolean indicator may be required in the supplementary uplink configuration to associate the random access parameters with the SUL carrier. For example, if the Boolean indicator is "1", the random access parameters may be associated with the SUL carrier. If the Boolean indicator is "0", the random access parameters may not be associated with the SUL carrier. If the Boolean indicator is "0", the random access parameters may be associated with another uplink carrier (e.g., NUL carrier). In some implementations, a Boolean value may be assigned in the non-supplementary uplink configuration (e.g., non-SupplementaryUplinkConfig IE, UplinkConfig IE, FrequencyInfoUL IE, UplinkConfig IE) using a Boolean indicator (e.g., RachCommonUsage) to inform the UE of the association between the NUL carrier and the random access parameters (e.g., contention-based random access parameters, contention-free random access parameters, common RACH configuration, dedicated random access configuration). In some implementations, the NR gNB/cell may configure the SUL carrier to the UE via the serving cell configuration. The serving cell configuration may comprise the random access parameters. In some implementations, one Boolean indicator may be required in the non-supplementary uplink configuration to associate the random access parameters with the NUL carrier. For example, if the Boolean indicator is "1", the random access parameters may be associated with the NUL carrier. If the Boolean indicator is "0", the random access parameters may not be associated with the NUL carrier. If the Boolean indicator is "0", the random access parameters may be associated with another uplink carrier (e.g., SUL carrier).

In some implementations, if the configuration for NUL carrier (e.g., FrequencyInfoUL IE, UplinkConfig IE, UplinkConfigCommon IE) is not present and only that for the SUL carrier (e.g., FrequencyInfoUL IE, SupplementaryUplink IE, SupplementaryUplinkConfig IE, UplinkConfig IE, UplinkConfigCommonSIB IE) is present in the serving cell configuration, the common RACH configuration specifically corresponding to contention-based random access parameters may be considered to implicitly associate with the SUL carrier. The common RACH configuration may be included in the serving cell configuration. In some implementations, if the configuration for NUL carrier is not present and only that for the SUL carrier is present in the serving cell configuration, the dedicated random access configuration (e.g., RACH-ConfigDedicated IE) specifically corresponding to contention-free random access parameters may be considered to implicitly associate with the SUL carrier. The dedicated random access configuration may be included in the serving cell configuration. In some implementations, if the configuration for SUL carrier is not present and only that for the NUL carrier is present in the serving cell configuration, the common RACH configuration specifically corresponding to contention-based random access parameters may be considered to implicitly associate with the NUL carrier. The common RACH configuration may be included in the serving cell configuration. In some implementations, if the configuration for SUL carrier is not present and only that for the NUL carrier is present in the serving cell configuration, the dedicated random access configuration specifically corresponding to contention-free random access parameters may be considered to implicitly associate with the NUL carrier. The dedicated random access configuration may be included in the serving cell configuration.

In some implementations, a choice indicator may be included in the common RACH configuration to indicate the contention-based random access parameters associated to the SUL, NUL or both uplink carriers. In some implementations, a choice indicator may be included in the dedicated random access configuration to indicate the contention-free random access parameters associated to the SUL, NUL or both uplink carriers. The choice indicator allows the forward compatibility extension if one cell supports more than two uplink carriers. In some implementations, a Boolean indicator may be included in the common RACH configuration to indicate whether the contention-based random access parameters are associated to a specific uplink carrier. For example, if the Boolean indicator is "1", the UE may apply the common RACH configuration for the SUL carrier. If the Boolean indicator is "0", the UE may apply the common RACH configuration for the NUL carrier. In some implementations, a Boolean indicator may be included in the dedicated random access configuration to indicate whether the contention-free random access parameters are associated to a specific uplink carrier. For example, if the Boolean indicator is "1", the UE may apply the dedicated random access configuration for the SUL carrier. If the Boolean indicator is "0", the UE may apply the dedicated random access configuration for the NUL carrier. It is noted that the common RACH configuration including the indicator (e.g., choice indicator, Boolean indicator) may not be carried in the uplink carrier configuration such as the supplementary uplink configuration for SUL carrier and/or the normal uplink configuration for NUL carrier. It is noted that the dedicated random access configuration including the indicator (e.g., choice indicator, Boolean indicator) may not be carried in the uplink carrier configuration such as the supplementary uplink configuration for SUL carrier and/or the normal uplink configuration for NUL carrier.

In one embodiment, the NR gNB/cell may send a configuration information via an RRC message (e.g., RRC Reconfiguration message) to configure the RRC_CONNECTED UE with contention-free random access parameters specific to the SUL. The special cell configuration carried in the configuration information may include the synchronization reconfiguration that contains the dedicated random access configuration carrying the contention-free random access parameters. An indicator may be provided with the dedicated random access configuration to explicitly associate such contention-free random access parameters with either SUL or NUL carrier. For example, a Boolean indicator or a choice indicator may be applied to this case.

In some implementations, the UE may by default adopt the contention-based random access configuration on the SUL carrier. However, if the NR gNB/cell only configures the contention-free random access configuration on the SUL carrier, the UE may perform the contention-free random access procedure. If the NR gNB/cell configures both the contention-free random access parameters and contention-based random access parameters on the SUL carrier, the UE may select which random access parameters to follow based on the uplink traffic types. If the NR gNB/cell configures both the contention-free random access parameters and contention-based random access parameters on the SUL carrier, the UE may select which random access parameters to follow based on the RSRP threshold value. For example, the measured DL RSRP (e.g., SS blocks, CSI-RS) associated to the random access resources is higher than an RSRP threshold value, the UE may select the contention-free random access parameters on the SUL carrier.

In one embodiment of the present disclosure, the NR gNB/cell may send the configuration information to configure RRC_CONNECTED UE with the non-SUL carrier only in the cell (e.g., SpCell, SCell).

In some implementations, special cell configuration may carry the synchronization reconfiguration which contains the non-supplementary uplink configuration. The non-supplementary uplink configuration may have the frequency information for the non-SUL carrier. If other information is required for the non-SUL carrier, a new configuration may be required (e.g., Non-supplementaryUplink IE, UplinkConfigCommon IE, UplinkConfig IE) to include the frequency information for the non-SUL carrier and other information such as the random access information corresponding to such non-SUL carrier.

The supplementary uplink configuration in the special cell configuration may or may not be present. If the SpCell is configured with non-SUL carrier only, even though the supplementary uplink configuration is present, the value in the supplementary uplink configuration may be null. That is, the supplementary uplink configuration (e.g., SupplementaryUplink IE, SupplementaryUplinkConfig IE, UplinkConfig IE, UplinkConfigCommonSIB IE) is empty.

The non-SUL configuration may contain the common RACH configuration including contention-based random access parameters specifically to the non-SUL carrier. In some implementations, if the cell is not configured with SUL carrier, the serving cell configuration may not include the frequency information for SUL carrier. For example, the serving cell configuration may not include the supplementary uplink configuration.

An indicator (e.g., Boolean indicator or choice indicator) may be used in the common RACH configuration.

In some implementations, the UE may by default adopt the contention-based random access configuration on the non-SUL carrier. However, if the NR gNB/cell only configures the contention-free random access configuration on the non-SUL carrier, the UE may perform the contention-free random access procedure. If the NR gNB/cell configures both the contention-free random access parameters and contention-based random access parameters on the non-SUL carrier, the UE may select which random access parameters to follow based on the uplink traffic types. If the NR gNB/cell configures both the contention-free random access parameters and contention-based random access parameters on the non-SUL carrier, the UE can select which random access parameters to follow based on the RSRP threshold value. For example, the measured DL RSRP (e.g., SS blocks, CSI-RS) associated to the random access resources is higher than an RSRP threshold value, the UE may select the contention-free random access parameters on the non-SUL carrier.

Figure 8:
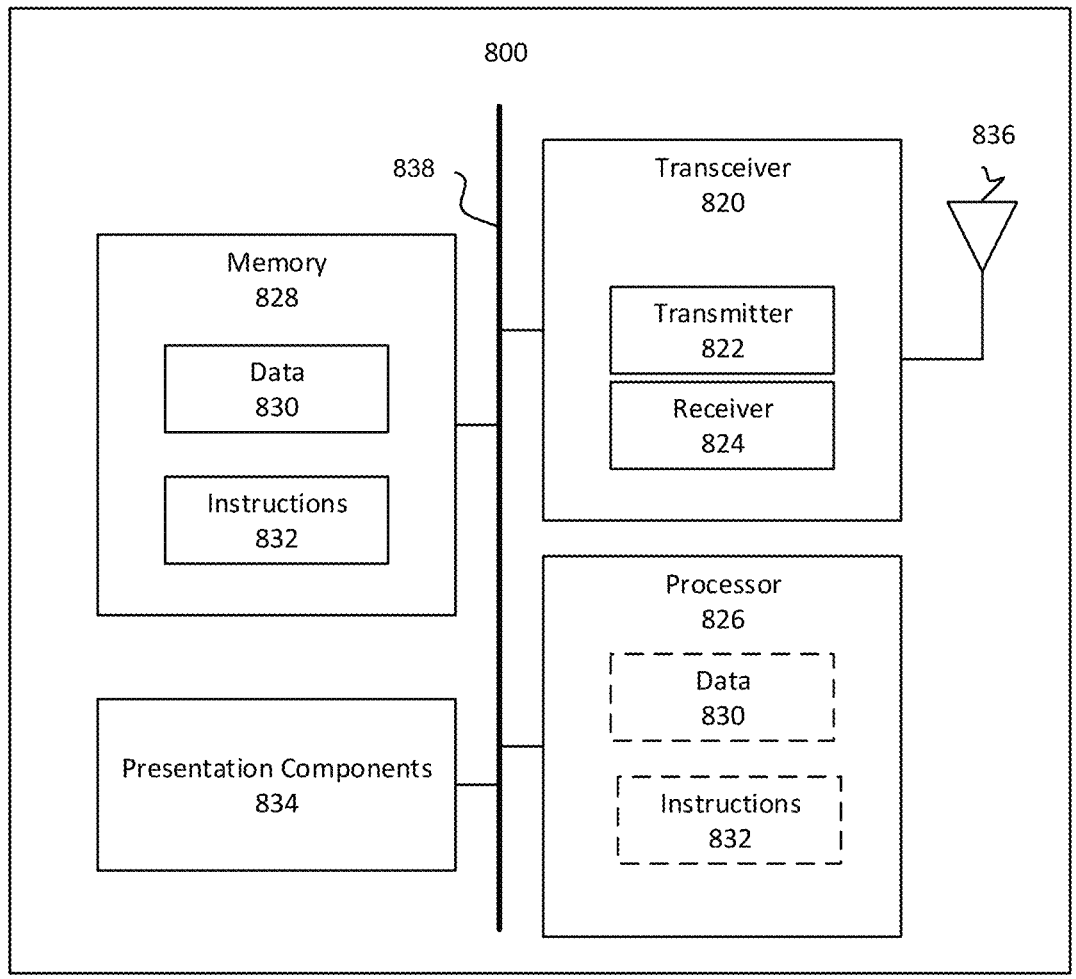
FIG. 8 is a block diagram of a device for wireless communication in accordance with various embodiments of the present disclosure.

FIG. 8 illustrates a block diagram of a device for wireless communication, according to various exemplary embodiments of the present disclosure. As shown in FIG. 8, device 800 may include transceiver 820, processor 826, memory 828, one or more presentation components 834, and at least one antenna 836. Device 800 may also include an RF spectrum band module, a base station communications module, a network communications module, and a system communications management module, input/output (I/O) ports, I/O components, and power supply (not explicitly shown in FIG. 8). Each of these components may be in communication with each other, directly or indirectly, over one or more buses 838.

Transceiver 820 having transmitter 822 and receiver 824 may be configured to transmit and/or receive time and/or frequency resource partitioning information. In some embodiments, transceiver 820 may be configured to transmit in different types of subframes and slots including, but not limited to, usable, non-usable and flexibly usable subframes and slot formats. Transceiver 820 may be configured to receive data and control channels.

Device 800 may include a variety of computer-readable media. Computer-readable media can be any available media that can be accessed by device 800 and include both volatile and non-volatile media, removable and non-removable media. By way of example, and not limitation, computer-readable media may comprise computer storage media and communication media. Computer storage media may include both volatile and non-volatile, removable and non-removable media implemented in any method or technology for storage of information such as computer-readable instructions, data structures, program modules or other data.

Computer storage media includes Random Access Memory (RAM), Read-Only Memory (ROM), Electrically-Erasable Programmable Read-Only Memory (EEPROM), flash memory or other memory technology, Compact Disc Read-Only Memory (CD-ROM), digital versatile disks (DVD) or other optical disk storage, magnetic cassettes, magnetic tape, magnetic disk storage or other magnetic storage devices. Computer storage media does not comprise a propagated data signal. Communication media typically may embody computer-readable instructions, data structures, program modules or other data in a modulated data signal such as a carrier wave or other transport mechanism and include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. Combinations of any of the above should also be included within the scope of computer-readable media.

Memory 828 may include computer-storage media in the form of volatile and/or non-volatile memory. Memory 828 may be removable, non-removable, or a combination thereof. Exemplary memory may include solid-state memory, hard drives, optical-disc drives, etc. As illustrated in FIG. 8, memory 828 may store computer-readable, computer-executable instructions 832 (e.g., software codes) that are configured to, when executed, cause processor 826 to perform various functions described herein, for example, with reference to FIGS. 1 through 7. Alternatively, instructions 832 may not be directly executable by processor 826 but be configured to cause device 800 (e.g., when compiled and executed) to perform various functions described herein.

Processor 826 may include an intelligent hardware device, e.g., a central processing unit (CPU), a microcontroller, an Application Specific Integrated Circuit (ASIC), etc. Processor 826 may include memory. Processor 826 may process data 830 and instructions 832 received from memory 828, and information through transceiver 820, the base band communications module, and/or the network communications module. Processor 826 may also process information to be sent to transceiver 820 for transmission through antenna 836, to the network communications module for transmission to a core network.

One or more presentation components 834 may present data indications to a person or other device. Exemplary one or more presentation components 834 may include a display device, speaker, printing component, vibrating component, etc.

From the above description it is manifest that various techniques can be used for implementing the concepts described in the present disclosure without departing from the scope of those concepts. Moreover, while the concepts have been described with specific reference to certain embodiments, a person of ordinary skill in the art would recognize that changes can be made in form and detail without departing from the scope of those concepts. As such, the described embodiments are to be considered in all respects as illustrative and not restrictive. It should also be understood that the present disclosure is not limited to the particular embodiments described above, but many rearrangements, modifications, and substitutions are possible without departing from the scope of the present disclosure.

What is claimed is:

1. A user equipment (UE) for wireless communication, the UE comprising:
   one or more non-transitory computer-readable media having executable instructions embodied thereon; and
   at least one processor coupled to the one or more non-transitory computer-readable media and configured to execute the executable instructions to cause the UE to:
   receive, from a base station, configuration information for at least two uplink carriers associated with the base station, the at least two uplink carriers including a supplementary uplink carrier (SUL) and a normal uplink carrier (NUL);
   select one of the at least two uplink carriers if a power of a first downlink reference signal received from the base station, as measured by the UE, is below a first threshold value;
   select, on the selected uplink carrier, a contention-free random access (CFRA) resource associated with a second downlink reference signal received from the base station if a power of the second downlink reference signal, as measured by the UE, is above a second threshold value; and
   perform a random access procedure with the base station by using the selected CFRA resource over the selected uplink carrier.

2. The UE of claim 1, wherein the first threshold value is carried in the configuration information.

3. The UE of claim 2, wherein a portion of the configuration information that carries the first threshold value is structured with a SetupRelease structure.

4. The UE of claim 1, wherein the configuration information is received through system information broadcast by the base station or through dedicated signaling.

5. The UE of claim 4, wherein the at least one processor is further configured to execute the executable instructions to cause the UE to:
   remove an existing uplink carrier configuration, in response to the configuration information having a null value when received through the system information.

6. The UE of claim 4, wherein frequency information for the selected uplink carrier is received in a synchronization reconfiguration through the dedicated signaling.

7. The UE of claim 1, wherein:
   the second downlink reference signal is a synchronization signal block (SSB) or a channel state information reference signal (CSI-RS), wherein;
   the second threshold value is associated with a signal quality of the SSB and the CFRA resource is associated with the SSB if the second downlink reference signal is the SSB; and
   the second threshold value is associated with a signal quality of the CSI-RS and the CFRA resource is associated with the CSI-RS if the second downlink reference signal is the CSI-RS.

8. The UE of claim 1, wherein the at least one processor is further configured to execute the executable instructions to cause the UE to:
   select a contention-based random access (CBRA) resource on the selected uplink carrier if the random access procedure using the selected CFRA resource fails.

9. The UE of claim 1, wherein the CFRA resource is configured in a primary cell configuration information element carried in a Radio Resource Control (RRC) message.

10. A method of operating a user equipment (UE) for wireless communication, the method comprising:
    receiving, from a base station, configuration information for at least two uplink carriers associated with the base station, the at least two uplink carriers including a supplementary uplink carrier (SUL) and a normal uplink carrier (NUL);

selecting one of the at least two uplink carriers if a power of a first downlink reference signal from the base station, as measured by the UE, is below a first threshold value;

selecting, on the selected uplink carrier, a contention-free random access (CFRA) resource associated with a second downlink reference signal from the base station if a power of the second downlink reference signal, as measured by the UE, is above a second threshold value; and performing a random access procedure with the base station by using the selected CFRA resource over the selected uplink carrier.

11. The method of claim 10, wherein the first threshold value is carried in the configuration information.

12. The method of claim 11, wherein a portion of the configuration information that carries the first threshold value is structured with a SetupRelease structure.

13. The method of claim 10, wherein the configuration information is received through system information broadcast by the base station or through dedicated signaling.

14. The method of claim 13, further comprising:
removing an existing uplink carrier configuration in response to the configuration information having a null value when received through the system information.

15. The method of claim 13, wherein frequency information for the selected uplink carrier is carried received in a synchronization reconfiguration through the dedicated signaling.

16. The method of claim 10, wherein:
the second downlink reference signal is a synchronization signal block (SSB) or a channel state information reference signal (CSI-RS), wherein
the second threshold value is associated with a signal quality of the SSB and the CFRA resource is associated with the SSB if the second downlink reference signal is the SSB; and
the second threshold value is associated with a signal quality of the CSI-RS and the CFRA resource is associated with the CSI-RS if the second downlink reference signal is the CSI-RS.

17. The method of claim 10, further comprising:
selecting a contention-based random access (CBRA) resource on the selected uplink carrier if the random access procedure using the selected CFRA resource fails.

18. The method of claim 10, wherein the CFRA resource is configured in a primary cell configuration information element carried in a Radio Resource Control (RRC) message.

* * * * *